3,453,798
PROCESS OF MAKING CONTAINERS
FOR LIQUIDS
Hans Hechenleitner, Villach, Austria, assignor to Hechenleitner & Cie, Villach, Austria, a corporation of Austria
No Drawing. Filed Aug. 2, 1967, Ser. No. 657,788
Claims priority, application Austria, Sept. 28, 1966,
A 9,087/66
Int. Cl. B65b 31/02, 61/04
U.S. Cl. 53—22
4 Claims

ABSTRACT OF THE DISCLOSURE

A process of making containers for liquids from a tube filled with the liquid to be packaged, from which the containers are separated after cross-welding, wherein a homongeneous mixture of the liquid to be packaged and of a dispersed inert gas with sterilizing or preserving qualities is filled in the tube to provide a counter pressure throughout the tube necessary for shaping the containers and, where after the containers are stored, the gas separates from the liquid forming a compressible cushion thereabove permitting an expansion of the liquid upon freezing without damage to the containers.

---

The present invention relates to process of making particularly tetragonal or square containers for liquids from a tube filled with the liquid to be packaged, from which the containers are separated after cross-welding.

The containers made from a tube according to conventional processes contain as much liquid as corresponds to their volume. This is self-evident, since the tube is filled with the liquid to a level corresponding to the height of several containers so that no air is included in the welded bags. This fact is utilized in conventional devices, where the bags are shaped into tetragonal or square containers because the liquid which fills the whole bag exerts the counter pressure needed for the shaping process.

However, such tightly filled bags or tetragonal or square containers have the disadvantage of not being suitable for deep freezing or for the use in regions exposed to frost since the frozen liquid has a greater volume than the container causing it thus to burst.

The present invention avoids this disadvantage, yet making it possible to produce tetragonal or square containers by using conventional devices.

The process according to the invention is characterized in that a homogeneous mixture of the liquid to be packaged and of a dispersed inert gas with sterilizing or preserving qualities is filled into the tube.

When storing the finished bags or tetragonal or square containers the gas from the liquid-gas mixture filled into the tube by means of the process according to the invention will soon separate, forming a gaseous cushion on top of the liquid. This cushion is of high compressibility and can balance the increase in volume caused by freezing the liquid, e.g. deep-freezing. The gases to be used comprise inert gases, namely rare gases, such as agron, as well as preserving or streilizing gases, such as frigen, ethylene oxide, nitrogen, carbonic acid, or the like, so that any bottling process used in the food processing industry but also in the pharmaceutical industry can be employed, taking all requirements into consideration.

The filling consisting of the liquid-gas mixture also has the necessary power to resist all transforming forces which appear during the shaping of bags into tetragonal or square containers so that there are no obstacles to produce such containers with conventional devices.

I claim:
1. A process of making containers for liquids especially adapted for freezing from a tube filled with a liquid to be packaged, comprising the steps of
   mixing a liquid to be packaged with an inert gas to obtain a temporary homogeneous mixture,
   filling a tube completely with said temporary homogeneous mixture,
   shaping and cross-welding said tube with said temporary homogeneous mixture filling said tube into a plurality of separate containers utilizing the counter pressure exerted by said temporary homogeneous mixture from within said tube, and
   said inert gas in said temporary homogeneous mixture separating from said liquid and forming a compressible gaseous cushion thereabove within said containers after said containers are formed.
2. The process, as set forth in claim 1, further comprising the step of
   mixing a preserving gas into said liquid to be packaged prior to filling said tube.
3. The process, as set forth in claim 1, further comprising the step of
   mixing a sterilizing gas into said liquid to be packaged prior to filling said tube.
4. The process, as set forth in claim 1, wherein said inert gas is argon.

References Cited

UNITED STATES PATENTS 3,063,211  11/1962  Graves _____ 53—112 X
3,406,079  10/1968  Gibble _____ 53—22 X TRAVIS S. McGEHEE, Primary Examiner.